(12) United States Patent
Pugel

(10) Patent No.: US 7,935,297 B2
(45) Date of Patent: May 3, 2011

(54) METHOD OF FORMING POINTED STRUCTURES

(75) Inventor: Diane E. Pugel, Washington, DC (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1004 days.

(21) Appl. No.: 11/370,396

(22) Filed: Mar. 6, 2006

(65) Prior Publication Data

US 2006/0197052 A1    Sep. 7, 2006

Related U.S. Application Data

(60) Provisional application No. 60/660,077, filed on Mar. 4, 2005.

(51) Int. Cl.
*H01F 1/04* (2006.01)
(52) U.S. Cl. .......................... 264/427; 264/429; 264/108
(58) Field of Classification Search .................. 264/427, 264/429
See application file for complete search history.

(56) References Cited

U.S. PATENT DOCUMENTS

| | | | |
|---|---|---|---|
| 4,946,613 A | 8/1990 | Ishikawa | |
| 5,628,659 A | 5/1997 | Xie et al. | |
| 5,769,996 A | 6/1998 | McArdle et al. | |
| 5,861,707 A * | 1/1999 | Kumar | .......................... 313/309 |
| 5,916,641 A | 6/1999 | McArdle et al. | |
| 5,935,454 A | 8/1999 | Tada et al. | |
| 5,954,991 A | 9/1999 | Hong et al. | |
| 6,056,889 A | 5/2000 | Tsuda et al. | |
| 6,057,172 A | 5/2000 | Tomihari | |
| 6,149,857 A | 11/2000 | McArdle et al. | |
| 6,174,449 B1 | 1/2001 | Alwan et al. | |
| 6,290,894 B1 | 9/2001 | Raj et al. | |
| 6,391,393 B1 | 5/2002 | Martin et al. | |
| 6,565,763 B1 * | 5/2003 | Asakawa et al. | ................. 216/56 |
| 6,786,174 B2 | 9/2004 | Schleier-Smith | |
| 6,844,378 B1 | 1/2005 | Martin et al. | |
| 6,960,528 B2 | 11/2005 | Chen et al. | |

* cited by examiner

*Primary Examiner* — Christina Johnson
*Assistant Examiner* — Xue Liu
(74) *Attorney, Agent, or Firm* — Christopher O. Edwards

(57) ABSTRACT

A method of forming an array of pointed structures comprises depositing a ferrofluid on a substrate, applying a magnetic field to the ferrofluid to generate an array of surface protrusions, and solidifying the surface protrusions to form the array of pointed structures. The pointed structures may have a tip radius ranging from approximately 10 nm to approximately 25 μm. Solidifying the surface protrusions may be carried out at a temperature ranging from approximately 10 degrees C. to approximately 30 degrees C.

30 Claims, 8 Drawing Sheets

METHOD OF FORMING POINTED STRUCTURES

CROSS REFERENCE TO RELATED APPLICATIONS

The benefit of priority is claimed under 35 U.S.C. 119(e) of U.S. Provisional Patent Application No. 60/660,077 filed Mar. 4, 2005, entitled "Template for Deposition of Micron and Sub-Micron Pointed Structures," which is incorporated by reference herein in its entirety.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

The present invention relates to a method of forming pointed structures and, more particularly, to a method of forming nanoscale pointed structures using a ferrofluid.

BACKGROUND OF THE INVENTION

Nanoscale pointed structures are known in the art. Such structures may be formed as individual pointed structures or they may be formed in arrays, such as, for example, nanotip arrays. There are a broad variety of applications for pointed structures, including use as stylii for surface profiling, scanning probe microscopy probe tips, and field emitter arrays. As field emitter arrays, these structures can be used to provide an electron source in applications such as, for example, microwave power amplifiers, flat panel displays, electron microscopy, electron beam lithography, photocathode detectors, and space propulsion systems.

Conventional techniques of forming nanoscale pointed structures include lithography, various types of etching, chemical vapor deposition, and manipulation of optical fibers and carbon nanotubes. There are a number of limitations associated with these conventional techniques. Some of the techniques are limited to the production of small arrays of structures. Others produce arrays of structures having wide distributions of height and/or aspect ratio. Still other techniques produce high quality arrays, but require equipment that is prohibitively expensive and materials that require special handling and are prone to breakage.

SUMMARY OF EXEMPLARY ASPECTS

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

To overcome the drawbacks of the prior art and in accordance with the purpose of the invention, as embodied and broadly described herein, one aspect of the invention relates to a method of forming an array of pointed structures comprising depositing a ferrofluid on a substrate, applying a magnetic field to the ferrofluid to generate an array of surface protrusions, and solidifying the surface protrusions to form the array of pointed structures.

As used herein, "ferrofluid" means a stable colloidal suspension of nanoscale magnetic particles dispersed with one or more surfactants in a liquid carrier.

In another aspect, the invention relates to a method of forming at least one pointed structure, comprising depositing a ferrofluid on a substrate, applying a magnetic field to the ferrofluid to generate at least one surface protrusion, and solidifying the at least one surface protrusion to form the at least one pointed structure.

In a further aspect, the invention provides a pointed structure consisting essentially of magnetic particles, produced by a process comprising depositing a ferrofluid on a substrate, applying a magnetic field to the ferrofluid to generate a surface protrusion, and solidifying the surface protrusion to form the pointed structure.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

DETAILED DESCRIPTION OF EXEMPLARY EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
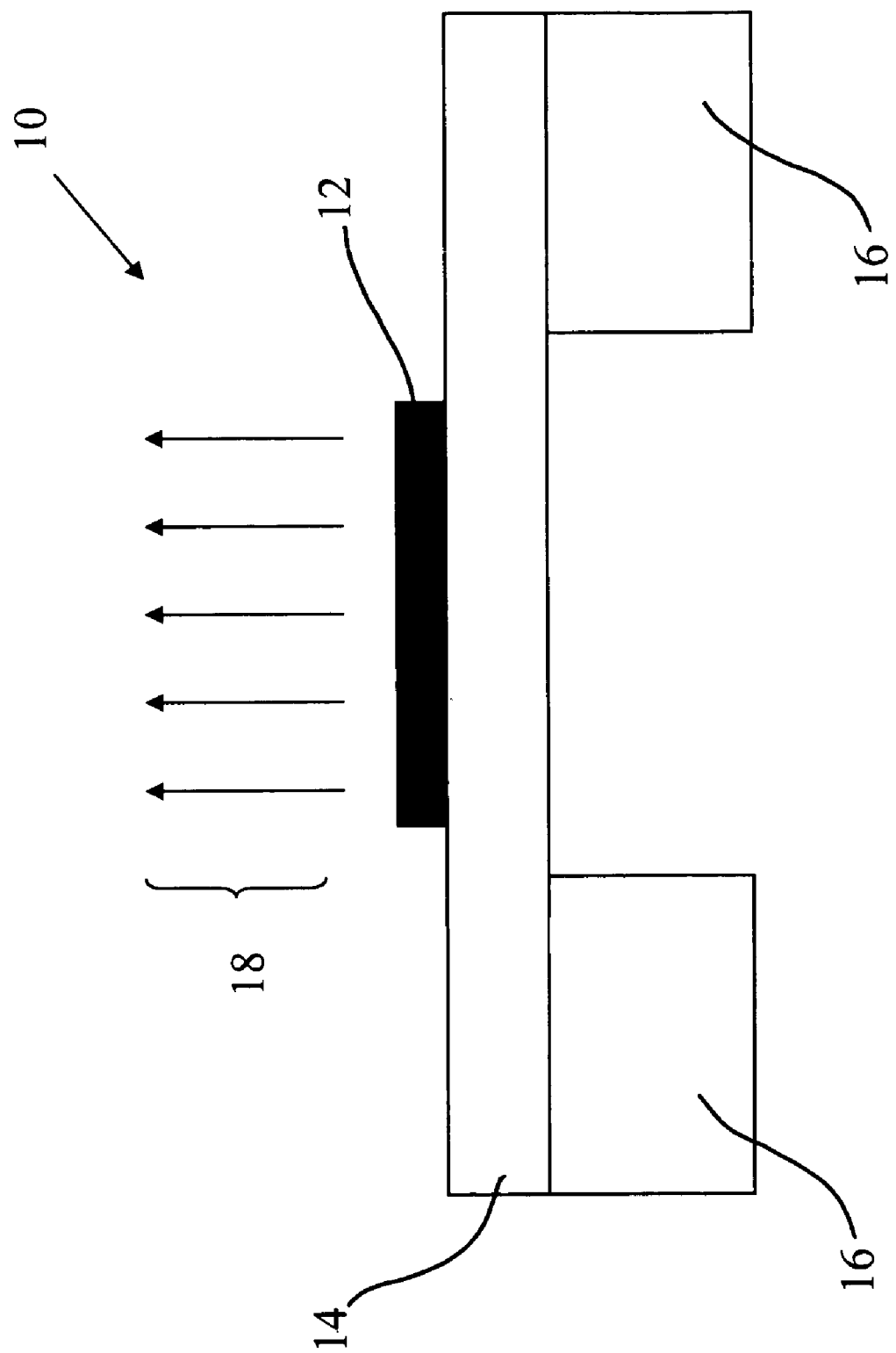
FIG. 1 is a schematic view of a device for carrying out an embodiment of the present invention.

FIG. 1 shows a device 10 for carrying out an embodiment of the method according to the invention. In one embodiment, the method of forming an array of pointed structures comprises depositing a ferrofluid 12 on a substrate 14. The ferrofluid may comprise a stable colloidal suspension of nanoscale magnetic particles dispersed with one or more surfactants in a liquid carrier. A typical ferrofluid may contain by volume about 5% magnetic particles, about 10% surfactant, and about 85% carrier liquid. These values are approximate and other proportions may also be used.

Ferrofluids may be formulated using a variety of compounds and combinations of compounds that are best suited to a desired application. For example, the magnetic particles may comprise at least one of iron oxides, manganese ferrites, cobalt ferrites, barium ferrites, metallic composite ferrites, and ferromagnetic metals. Optionally, the magnetic particles may comprise at least one of ferric oxide ($Fe_2O_3$) and magnetite ($Fe_3O_4$).

The nanoscale magnetic particles, which may have a particle size ranging from approximately 2 nm to approximately 30 nm, may be selected based on the physical and/or chemical properties they provide to the ferrofluid. These properties include saturation magnetization, viscosity, magnetic stability, and chemical stability.

The carrier liquid may comprise a polar or non-polar organic molecule, such as, for example, hydrocarbons, esters, alcohols, ethers, aldehydes, ketones, fatty acids, and/or phenols. Other compounds, organic and inorganic, may also be used.

The surfactants assure a permanent distance between the magnetic particles to overcome the forces of attraction caused by Van der Waals forces and magnetic interaction. They also provide a chemical composition on the outer layer of the covered particles that is compatible with the liquid carrier and the chemicals in the surrounding environment. Suitable surfactants may include unsaturated fatty acids and salts thereof, as well as silicone-type surfactants and fluorine-type surfactants. Other surfactants may also be used.

The ferrofluid 12 may be deposited on the substrate 14, as shown in FIG. 1, in droplet form. Alternatively, the ferrofluid may be spin-coated onto the substrate 14. Spin-coating may provide a more even distribution of the ferrofluid 12 on the substrate 14.

The substrate 14 may comprise glass, ceramic, or other materials that are non-reactive, non-magnetic, and/or resistant to cleaning solvents. As shown in FIG. 1, the substrate is positioned on supports 16, which may also comprise a non-reactive and/or non-magnetic material, such as glass, for example.

The method of this embodiment further comprises applying a magnetic field to the ferrofluid to generate an array of surface protrusions. In the embodiment shown in FIG. 1, the magnetic field 18 is substantially uniform. A uniform magnetic field may be produced by at least one of (i) at least one permanent magnet, (ii) at least one electromagnet, and (iii) at least one oscillating electrical field. Electromagnets and/or electrical sources, such as Helmholtz coils and solenoids, for example, may provide better control over the strength and distribution of the applied magnetic field. Other methods and devices may also be used to generate a magnetic field.

In ferrofluids, surface protrusions form in the presence of a magnetic field in order to stabilize a surface instability. In particular, in the presence of a magnetic field normal to the plane of a ferrofluid surface (e.g., substantially perpendicular to the substrate), magnetic moments in the ferrofluid align along the locally applied static magnetic field, or in the case of a field gradient, along the regions of highest magnetic flux, forming chains. Dipolar coupling between adjacent magnetic particles generates a single domain structure and conical surface protrusions form. Over time, columnar structures in the fluid develop as neighboring chains work together. The number and configuration of the surface protrusions is dependent upon the magnetic field amplitude and distribution.

In one embodiment, the applied magnetic field has a strength equal to or greater than the saturation magnetization of the ferrofluid. When the magnetic field strength has exceeded the saturation magnetization, additional increases in field strength will not result in increased alignment of magnetic moments in the ferrofluid.

The method of this embodiment further comprises solidifying the surface protrusions to form the array of pointed structures. In one embodiment, solidifying the surface protrusions may comprise evaporating the carrier liquid of the ferrofluid. In a further embodiment, evaporating the carrier liquid may be carried out at a temperature ranging from approximately 10 degrees C. to approximately 30 degrees C. In yet another embodiment, evaporating the carrier liquid is carried out at a temperature ranging from approximately 15 degrees C. to approximately 25 degrees C. The ability to solidify the surface protrusions at room temperature to form an array of pointed structures may facilitate the production of such structures.

Solidifying the surface protrusions according to embodiments of the invention forms an array of pointed structures consisting essentially of magnetic particles. Pointed structures "consisting essentially of" magnetic particles may contain other materials, as long as the other materials are present in small enough quantities that they do not materially affect the performance of the pointed structures. In one example, pointed structures formed according to an embodiment of the invention were analyzed using X-ray diffraction. The analysis indicated the presence of the magnetic particles with no detectable levels of the carrier fluid or the surfactant.

According to one embodiment, the method further comprises coating the pointed structures with a thin film. The thin film may comprise at least one of a semiconducting thin film, an insulating thin film, and a conducting thin film. The coating may be carried out using a suitable coating technique, including, for example, sputter deposition, chemical vapor deposition, thermal evaporation, and/or pulsed laser deposition. Other coating techniques may also be used.

Figure 2:
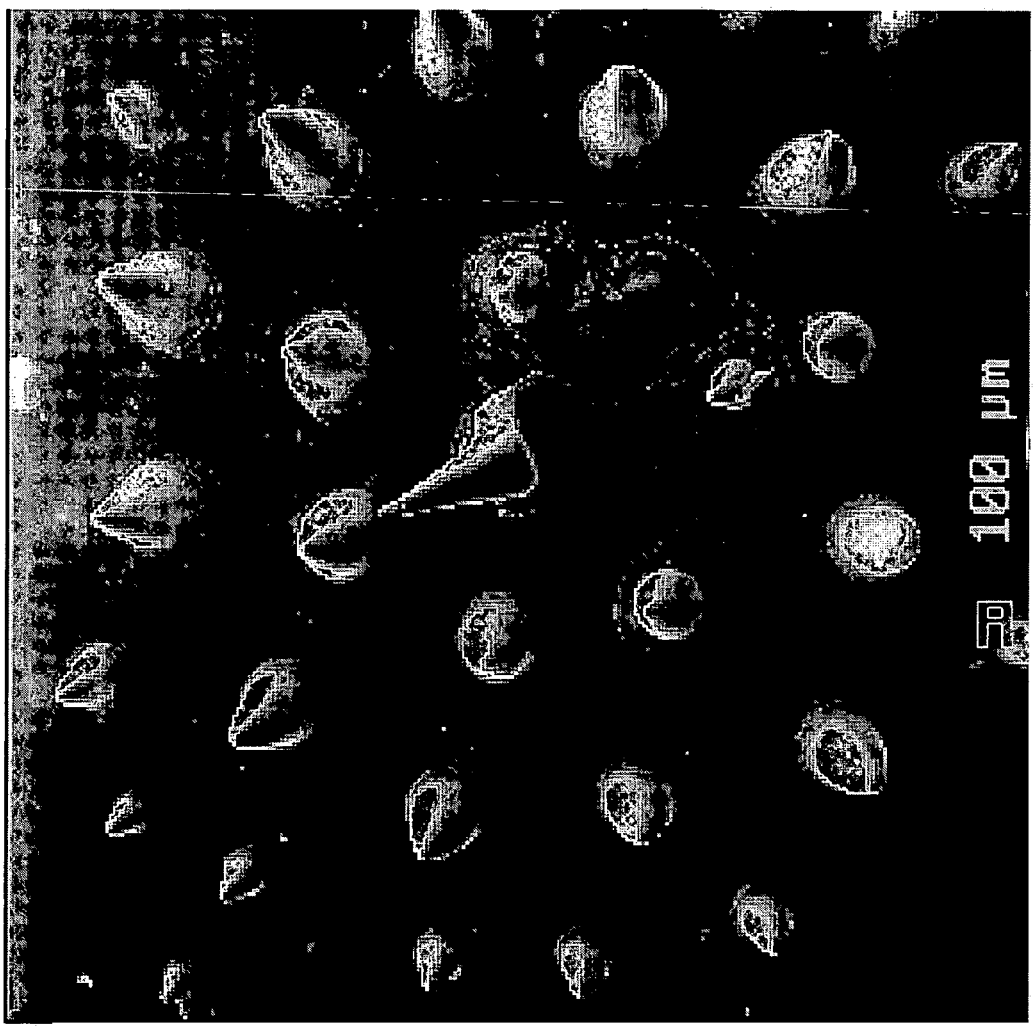
FIG. 2 is a scanning electron micrograph of an array of pointed structures formed according to an embodiment of the present invention.
Figure 3:
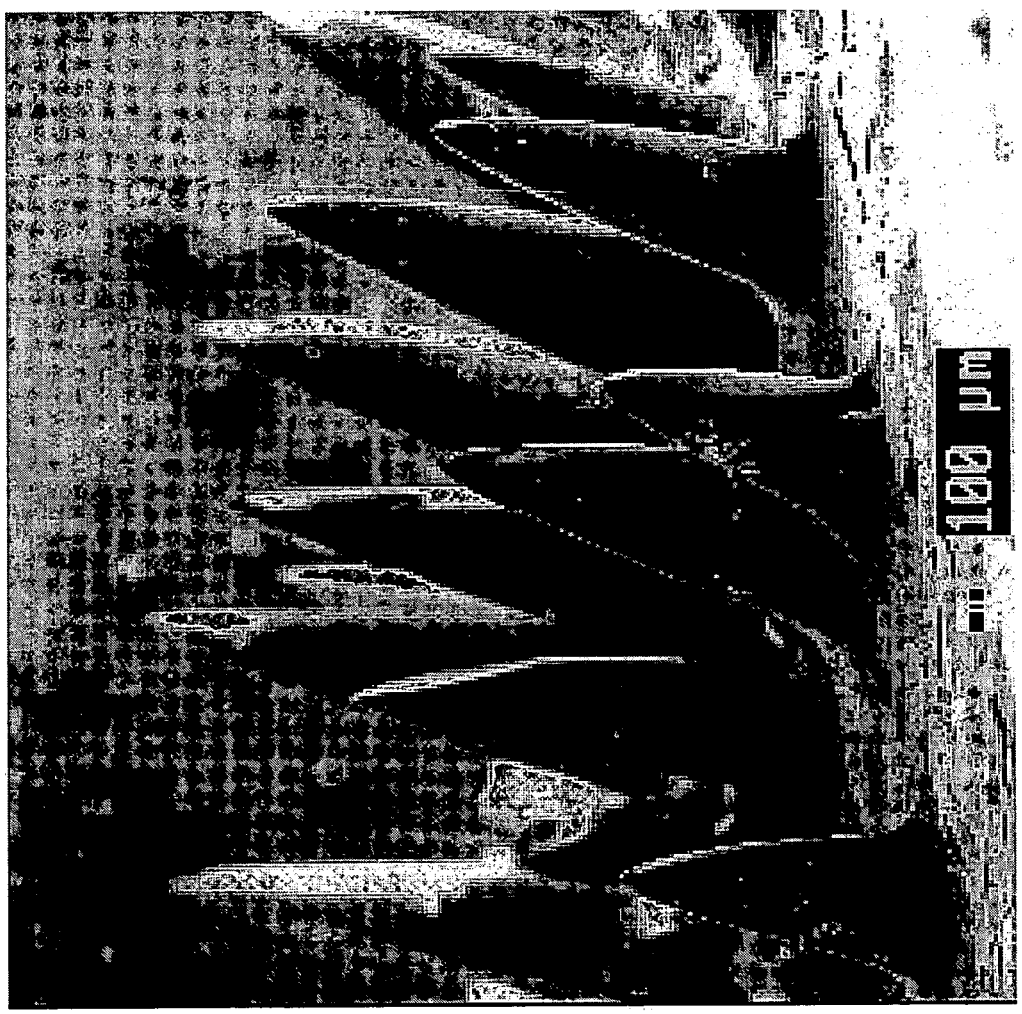
FIG. 3 is a scanning electron micrograph of an array of pointed structures formed according to another embodiment of the present invention.
Figure 4:
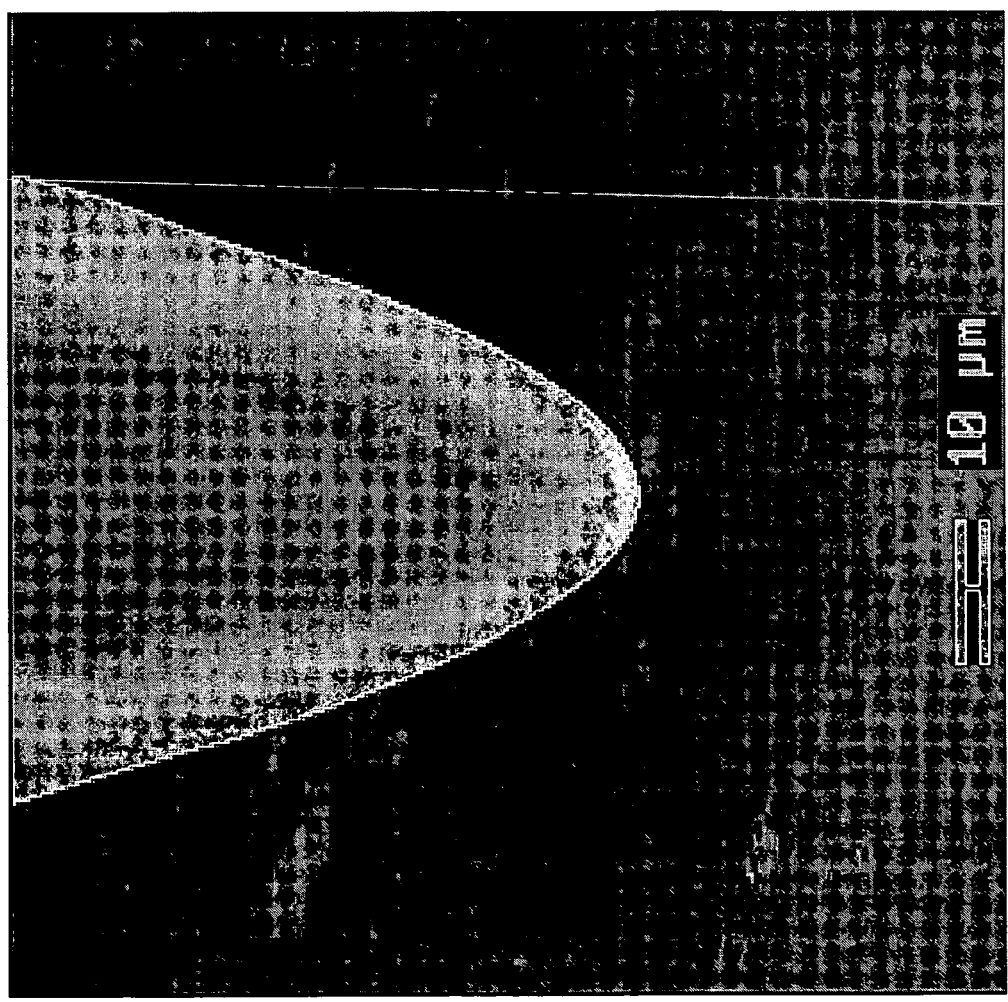
FIG. 4 is a scanning electron micrograph of the tip of a pointed structure formed according to another embodiment of the present invention.
Figure 5:
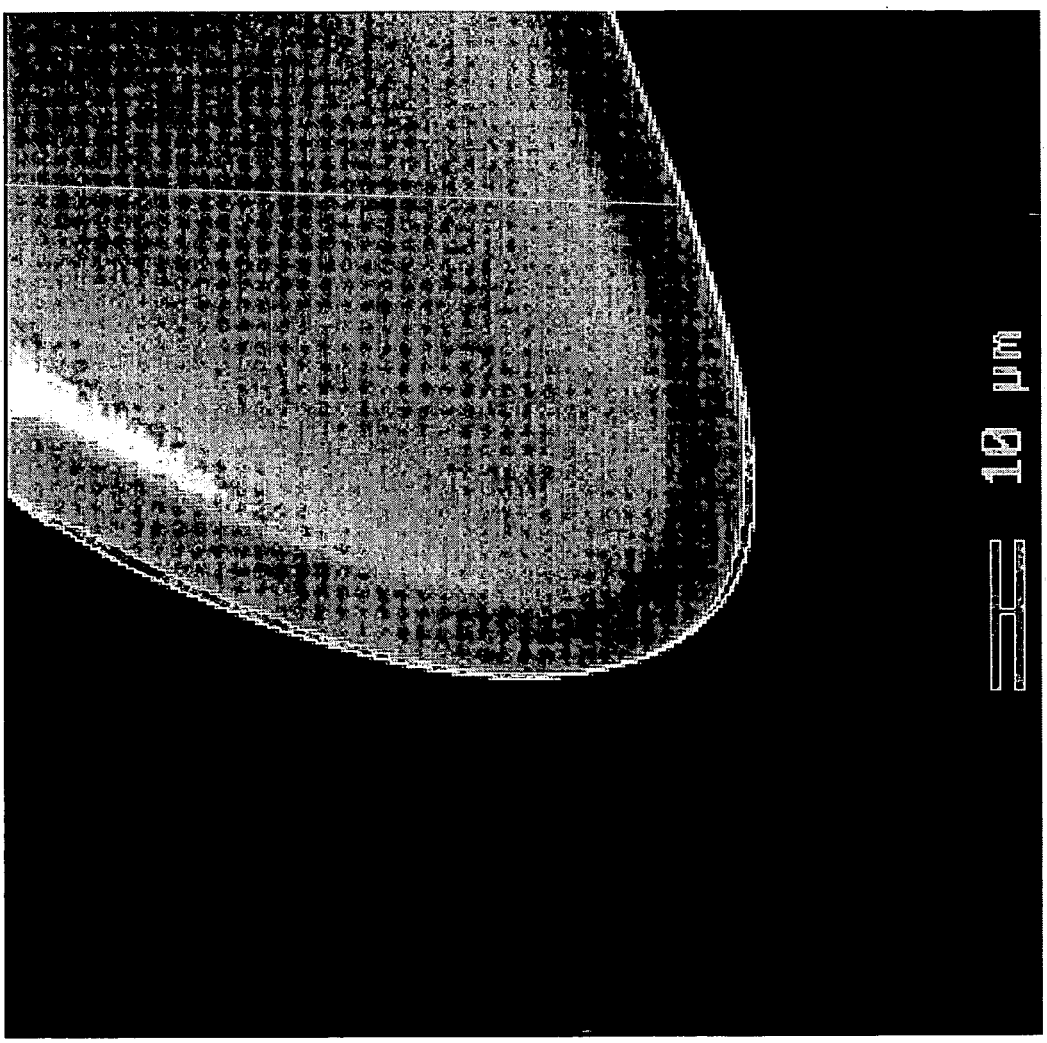
FIG. 5 is a scanning electron micrograph of the tip of a pointed structure formed according to another embodiment of the present invention.
Figure 6:
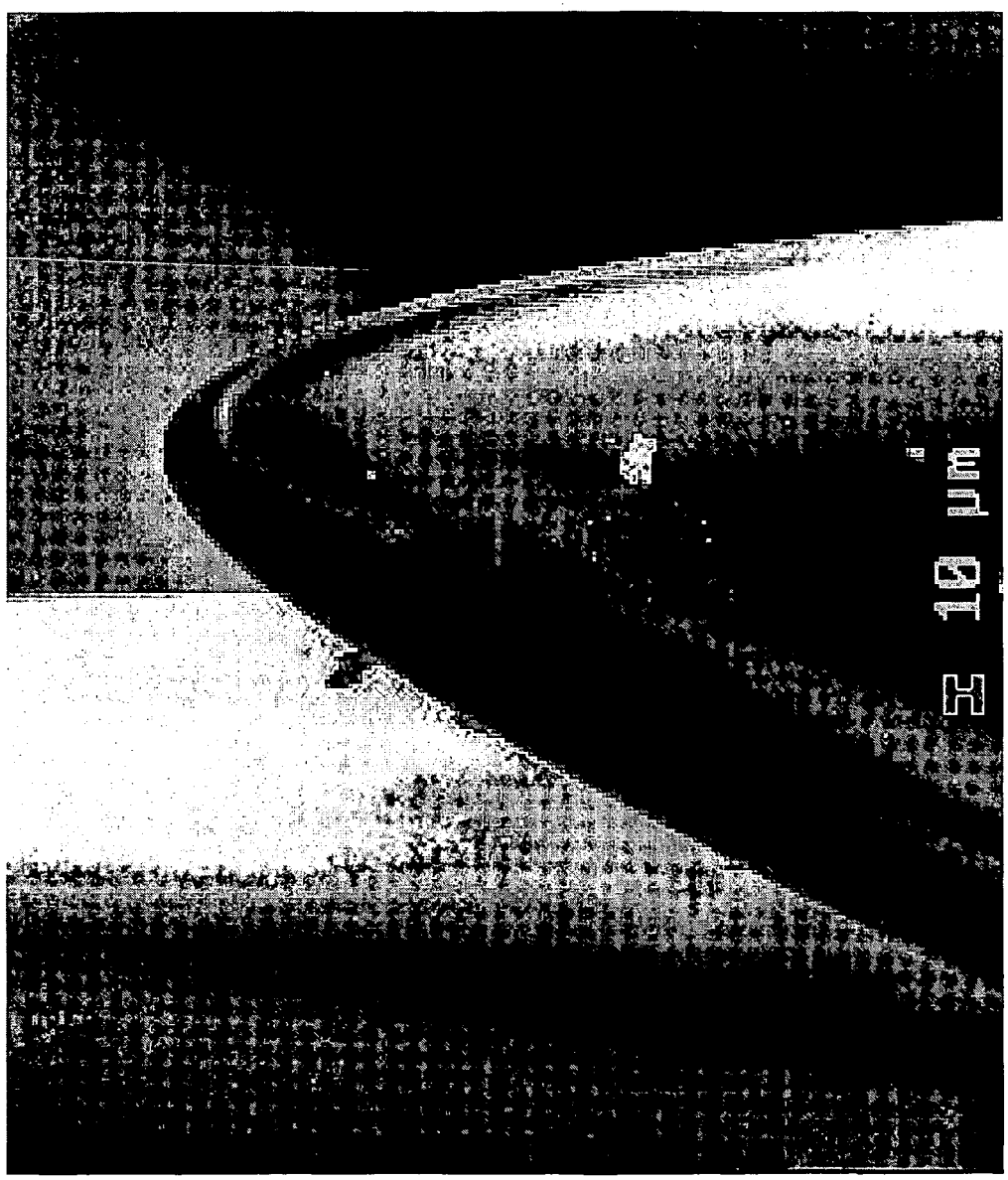
FIG. 6 is a scanning electron micrograph of the tip of a pointed structure formed according to another embodiment of the present invention.

In one example, an array of pointed structures formed according to an embodiment of the invention were coated with 3000 Å of silver (Ag) using thermal evaporation carried out at $10^{-7}$ Torr. The coated structures were examined using scanning electron microscopy. The associated scanning electron micrographs for two portions of the coated structures are shown in FIGS. 2 and 3, respectively. Further, scanning electron micrographs of individual tips of three pointed structures are shown in FIGS. 4-6, respectively. A scale is provided on each micrograph.

The pointed structures produced according to some embodiments are substantially parallel. Further, in some embodiments, the pointed structures have an aspect ratio of at least 1 to 3. The aspect ratio is defined as the ratio of the diameter of the base of the pointed structure to the height of that structure. In other embodiments, the pointed structures have an aspect ratio of at least 1 to 10. In further embodiments, the pointed structures have an aspect ratio of at least 1 to 20. In still further embodiments, the pointed structures have an aspect ratio of at least 1 to 50.

Figure 7:
FIG. 7 is a photograph of an array of surface protrusions on a ferrofluid formed according to another embodiment of the present invention.

The pointed structures produced according to embodiments of the invention define respective tips. In some embodiments, such as those shown in FIGS. 2-6, the tips have a substantially conical shape. In further embodiments, the substantially conical shape is a compound conical shape. The compound conical shape may comprise a "tip on a tip" structure, as shown in the photograph of FIG. 7, which depicts the surface protrusions on a ferrofluid formed according to an embodiment of the invention.

According to some embodiments of the invention, the tips on the pointed structures are substantially evenly spaced. In one embodiment, the tips are spaced at a distance ranging from approximately 50 µm to approximately 400 µm.

According to other embodiments of the invention, the tips have a substantially identical radius. In one embodiment, the radius ranges from approximately 10 nm to approximately 25 µm. In another embodiment, the radius ranges from approximately 10 nm to approximately 750 nm.

According to another embodiment, a method of forming at least one pointed structure comprises depositing a ferrofluid on a substrate, applying a magnetic field to the ferrofluid to generate at least one surface protrusion, and solidifying the at least one surface protrusion to form the at least one pointed structure.

In one embodiment, applying a magnetic field comprises disposing a first magnetic field generating element proximate to a first surface of the substrate. As discussed above, in some embodiments, the magnetic field is produced by at least one of (i) at least one permanent magnet, (ii) at least one electromagnet, and (iii) at least one oscillating electrical field. As in the embodiments described above, other methods and devices may also be used to generate a magnetic field.

In another embodiment, applying a magnetic field further comprises disposing a second magnetic field generating element proximate to a second surface of the substrate. In yet another embodiment, the first magnetic field generating element and the second magnetic field generating element comprise permanent magnets. In this embodiment, the arrangement of two permanent magnets provides a uniform magnetic field, which tends to align the surface protrusions and maximize their aspect ratio.

In one example, an embodiment of the present invention was carried out using a ferrofluid manufactured by FERROTEC® under the product name EFH1®. EFH1® comprises 3-15% by volume magnetite ($Fe_3O_4$) particles suspended in a light mineral oil carrier fluid with a proprietary surfactant and has a saturation magnetization of 400 Gauss.

Figure 8:
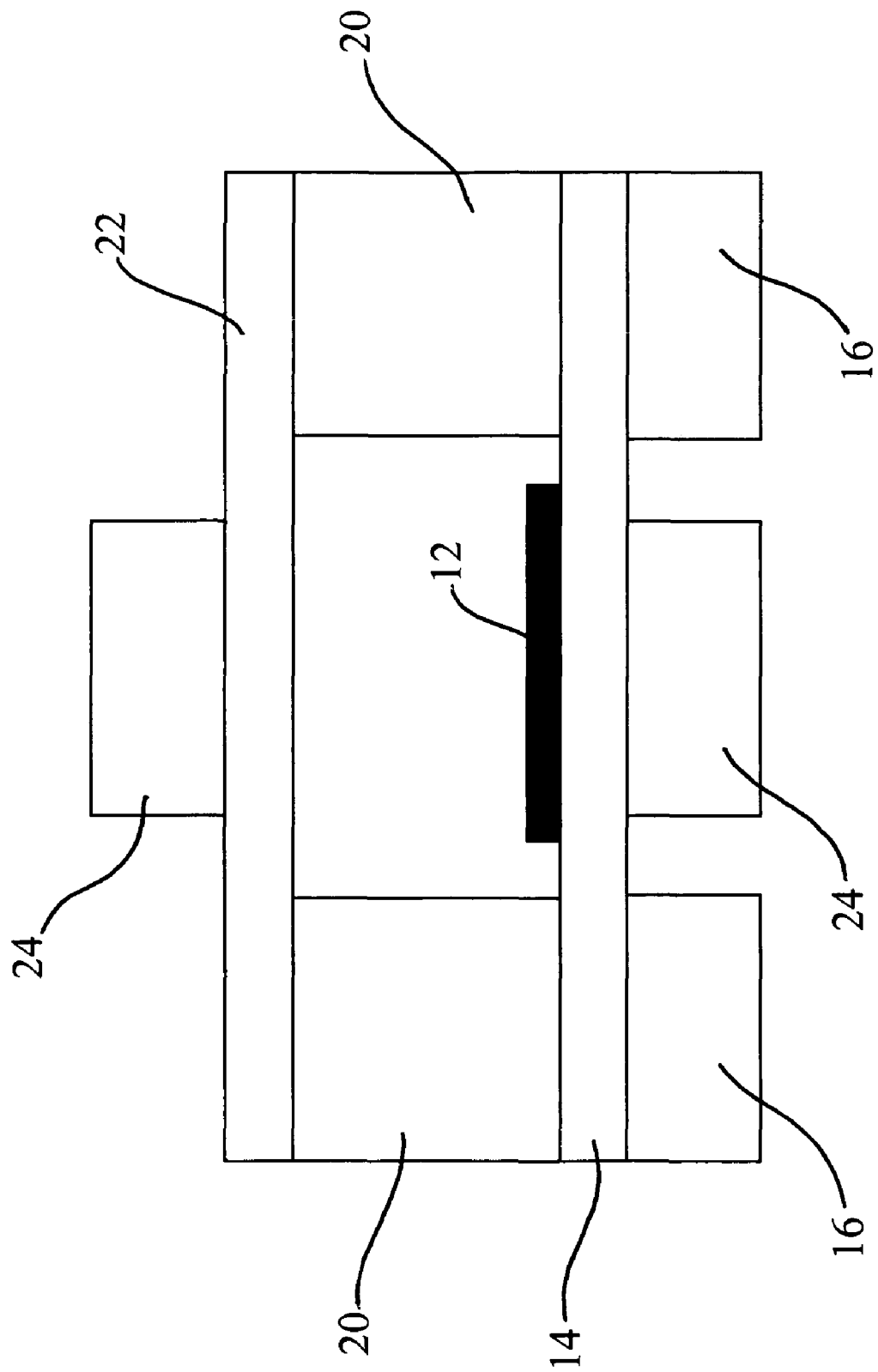
FIG. 8 is a schematic view of a device for carrying out another embodiment of the present invention.

Approximately 1 mL of the ferrofluid 12 was spin-coated onto a first glass substrate 14, which was disposed on two glass supports 16, as shown in FIG. 8. Two more glass supports 20 and a second glass substrate 22 were disposed on an upper surface of the first glass substrate 14, as shown. A magnetic field was applied to the ferrofluid 12 using two NdFeB permanent magnets 24, each having a diameter of approximately 15 cm, a maximum magnetic field of approximately 2.5 kG, and a field gradient across the surface of the magnet of approximately 213 G/mm. One magnet 24 was disposed below the first substrate 14 and the other magnet 24 was disposed over the ferrofluid 12 on an upper surface of the second substrate 22.

The resulting magnetic field generated an array of substantially conical surface protrusions in the ferrofluid. The surface protrusions were solidified at room temperature using a fan to evaporate the surfactant, leaving an array of pointed structures consisting essentially of magnetite.

In another example, approximately 1 mL of the EFH1® ferrofluid was spin-coated onto a first glass substrate. A 1 kG permanent magnet was disposed beneath the substrate. The magnetic field gradient across the magnet surface was approximately 0.061 kG/mm. A second permanent magnet was disposed over the ferrofluid on an upper surface of the second substrate. Again, the resulting magnetic field generated an array of substantially conical surface protrusions in the ferrofluid. The surface protrusions were solidified at room temperature using a fan to evaporate the surfactant, leaving an array of pointed structures consisting essentially of magnetite.

Structures prepared according to embodiments of the invention have withstood the vacuum and high temperature conditions associated with certain types of thin film coating processes. In one example, an array of pointed structures was placed in a vacuum chamber, pumped to $10^{-7}$ Torr, and held under a vacuum for six hours. No change in the pointed structures was observed. To test for thin film adhesion at elevated temperatures, a 1500 Å thick film of a wide band-gap semiconductor, $Mg_{0.15}Zn_{0.85}O$, was deposited via radio frequency (RF) sputtering at 100 degrees C. with a pressure of 1.6 e-2 mbar. No notable change was observed in the pointed structures and the thin film continued to adhere to the pointed structures post-deposition.

The method of the present invention may be useful for creating emitters to be coated by wide bandgap semiconductors, which can absorb and emit electrons in the ultraviolet light bands. These materials, such as ZnO, are an excellent alternative for traditional, large, high-voltage photocathode systems. Coating the array of pointed structures with ZnO or other oxide avoids the oxidizing properties associated with metals typically used in photocathodes (e.g., tungsten or chromium). Therefore, the photocathodes utilizing the pointed structures of the present invention may be less susceptible to contamination, decay, and radiation damage, and may be more chemically and structurally stable.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. A method of forming an array of pointed structure field emitters, comprising: depositing a ferrofluid contained in a carrier liquid in one of a droplet or spin-coated form on a substrate; applying a combined uniform magnetic field substantially perpendicular to the substrate to the ferrofluid by disposing a first magnetic field generating element proximate to a first surface of the substrate and disposing a second magnetic field element generating element proximate to a second surface of the substrate to generate an array of surface protrusions and coating the pointed structure field emitters with wide bandgap semiconductors for absorbing and emitting electrons in the ultra violet wavelength region; solidifying by evaporating the carrier liquid at approximately room temperature, and aligning the surface protrusions thus maximizing the aspect ratio of said protrusions to form the array of pointed structure field emitters.

2. The method of claim 1, wherein the magnetic field is produced by at least one of (i) at least one permanent magnet, (ii) at least one electromagnet, and (iii) at least one oscillating electrical field.

3. The method of claim 1, wherein the magnetic field has a strength equal to or greater than a saturation magnetization of the ferrofluid.

4. The method of claim 1, wherein the pointed structures consist essentially of magnetic particles.

5. The method of claim 4, wherein the magnetic particles comprise at least one of iron oxides, manganese ferrites, cobalt ferrites, barium ferrites, metallic composite ferrites, and ferromagnetic metals.

6. The method of claim 5, wherein the magnetic particles comprise at least one of ferric oxide ($Fe2O3$) and magnetite ($Fe3O4$).

7. The method of claim 1, wherein the pointed structure field emitters are substantially parallel.

8. The method of claim 1, wherein the pointed structure field emitters have an aspect ratio of at least 1 to 3.

9. The method of claim 8, wherein the pointed structure field emitters have an aspect ratio of at least 1 to 10.

10. The method of claim 9, wherein the pointed structure field emitters have an aspect ratio of at least 1 to 20.

11. The method of claim 10, wherein the pointed structure field emitters have an aspect ratio of at least 1 to 50.

12. The method of claim 1, wherein each of the pointed structure field emitters comprises a tip.

13. The method of claim 12, wherein the tips have a substantially conical shape.

14. The method of claim 13, wherein the substantially conical shape is a compound conical shape.

15. The method of claim 12, wherein the tips are substantially evenly spaced.

16. The method of claim 15, wherein the tips are spaced at a distance ranging from approximately 50 μm to approximately 400 gm.

17. The method of claim 12, wherein the tips have a substantially identical radius.

18. The method of claim 17, wherein the radius ranges from approximately 10 nm to approximately 25 μm.

19. The method of claim 18, wherein the radius ranges from approximately 10 nm to approximately 750 nm.

20. The method of claim 1, wherein evaporating the carrier liquid is carried out at a temperature ranging from approximately 10 degrees C. to approximately 30 degrees C.

21. The method of claim 20, wherein evaporating the carrier liquid is carried out at a temperature ranging from approximately 15 degrees C. to approximately 25 degrees C.

22. The method of claim 1, further comprising coating the pointed structures with a thin film.

23. The method of claim 22, wherein the thin film comprises at least one of a semiconducting thin film, an insulating thin film, and a conducting thin film.

24. A method of forming at least one pointed structure field emitter, comprising: depositing a ferrofluid contained in a carrier liquid in one of a droplet or spin-coated form on a substrate; applying a combined uniform magnetic field substantially perpendicular to the substrate to the ferrofluid by disposing a first magnetic field generating element proximate to a first surface of the substrate and disposing a second magnetic field element generating element proximate to a second surface of the substrate to generate at least one surface protrusion; coating the pointed structure field emitters with wide bandgap semiconductors for absorbing and emitting electrons in the ultra violet wavelength region; solidifying by evaporating the carrier liquid at approximately room temperature, and aligning the at least one surface protrusion thus maximizing the aspect ratio of said protrusion to form the at least one pointed structure field emitter.

25. The method of claim 24, wherein the magnetic field is produced by at least one of (i) at least one permanent magnet, (ii) at least one electromagnet, and (iii) at least one oscillating electrical field.

26. The method of claim 25, wherein the first magnetic field generating element and the second magnetic field generating element comprise permanent magnets.

27. The method of claim 24, wherein the at least one pointed structure comprises a substantially conical tip.

28. The method of claim 27, wherein the tip has a radius ranging from approximately 10 nm to approximately 25 μm.

29. The method of claim 28, wherein the tip has a radius ranging from approximately 10 nm to approximately 750 nm.

30. The method of claim 24, wherein solidifying the at least one surface protrusion comprises evaporating a carrier liquid of the ferrofluid at a temperature ranging from approximately 10 degrees C. to approximately 30 degrees C.

* * * * *